United States Patent
Sheng

[11] Patent Number: 6,144,475
[45] Date of Patent: Nov. 7, 2000

[54] OPTICAL SYSTEM FOR SCANNER

[75] Inventor: Thomas Sheng, Hsin-Chu, Taiwan

[73] Assignee: Avision, Inc., Hsin-Chu, Taiwan

[21] Appl. No.: 09/186,059

[22] Filed: Nov. 9, 1998

[51] Int. Cl.[7] ................................................. G02B 26/08
[52] U.S. Cl. ........................ 359/196; 359/223; 359/857; 359/861; 355/66
[58] Field of Search ..................................... 359/196, 223, 359/857, 861; 355/51, 66; 399/151

[56] References Cited

U.S. PATENT DOCUMENTS

| 5,033,821 | 7/1991 | Hama et al. | 355/66 |
| 5,585,937 | 12/1996 | Kokubo et al. | 359/861 |
| 5,815,329 | 9/1998 | Tseng | 359/857 |

Primary Examiner—Darren Schuberg
Attorney, Agent, or Firm—H. C. Lin

[57] ABSTRACT

The reflection mirrors in the optical system of a scanner is arranged to have reflections in a vertical direction instead of a horizontal direction as is commonly done. Then, the horizontal dimension of the scanner can be reduced.

16 Claims, 10 Drawing Sheets

OPTICAL SYSTEM FOR SCANNER

BACKGROUND OF THE INVENTION

This invention relates to scanners, in particular to the optical system of a scanner.

A traditional optical system for a scanner is shown in FIG. 1. The optical system comprises a series of reflecting mirrors, a first reflecting mirror 111, a second reflecting mirror 112 and a third reflecting mirror 113. These three mirrors reflect light back and forth horizontally. The light reflected from the third mirror passes through a lens 12 and is incident on an image sensor 13. Such an optical system with reflected light traversing in a horizontal direction occupies a great deal of space, and makes the scanner bulky.

SUMMARY

An object of this invention is to provide a space-saving optical system for a scanner. Another object of this invention is to provide an optical system, which allows the scanner to scan close to the folding edge of a book.

These objects are achieved by reflecting the scanned signal light several times in a vertical direction before deflecting it in a horizontal direction for sensitizing a light sensor. The vertical reflections save space in the horizontal direction or a designated direction, because the reflecting mirrors are no longer lined up in a horizontal direction to occupy space.. Thus, the horizontal dimension of the scanner, hence the overall dimension, is reduced.

DETAILED DESCRIPTION OF THE PREFERRED EMBODIMENTS

Figure 1:
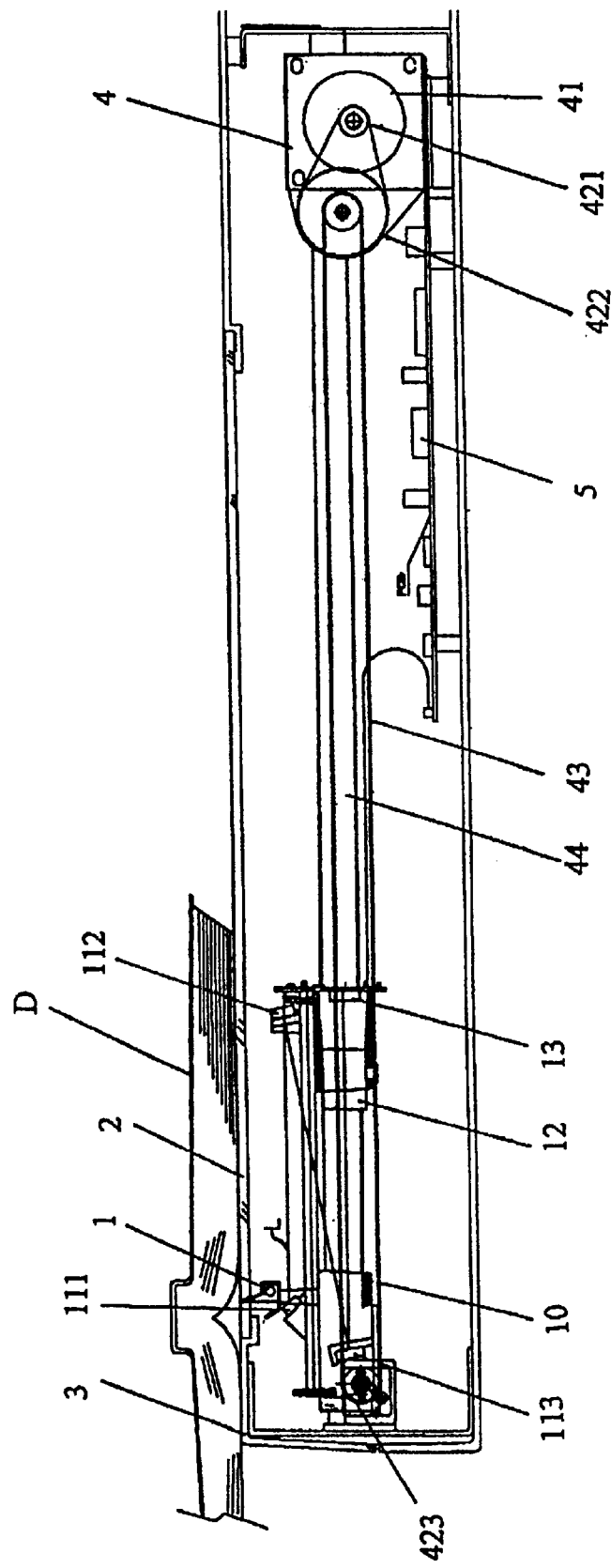
FIG. 1 shows a prior art optical system for a scanner.
Figure 2:
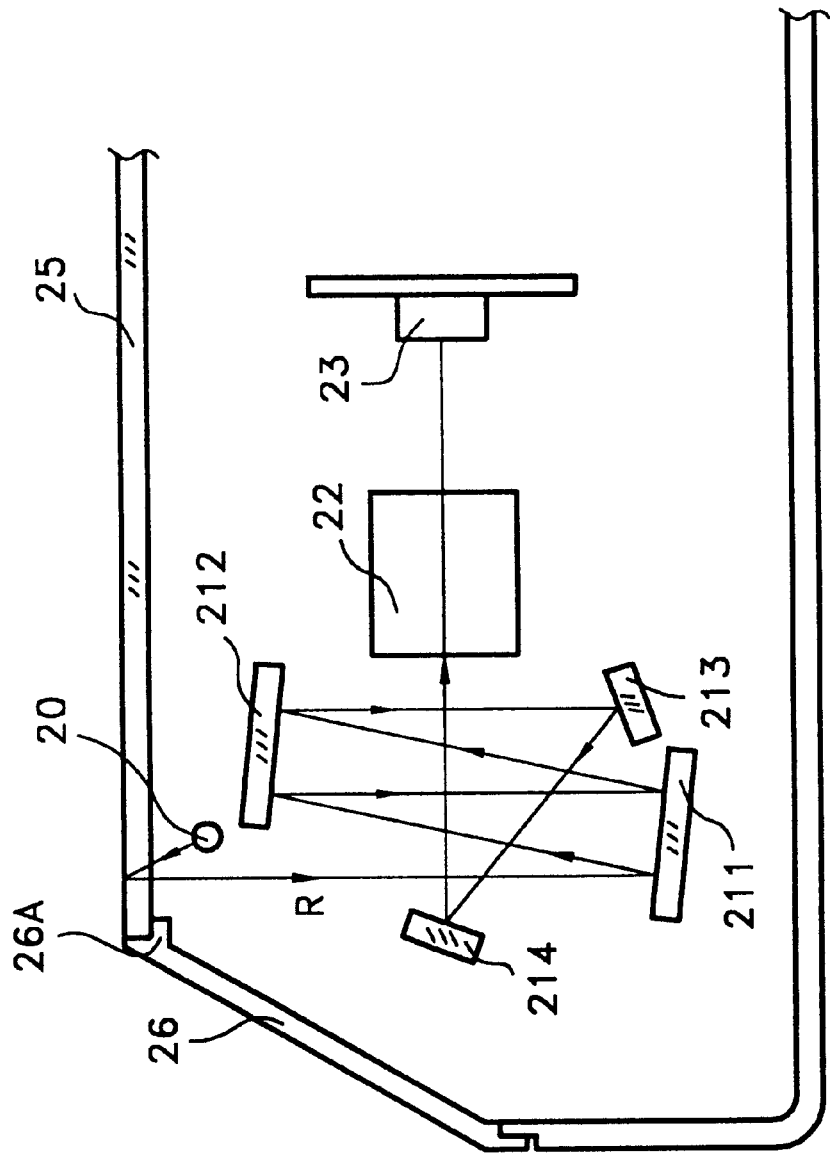
FIG. 2 shows a first embodiment of the optical system of the present invention for an obtuse angle between the scanning window and the side wall against which a book leans.

FIG. 2 shows an optical system for a scanner having a obtuse angle between the scanning window 25 and a side wall 26. The fold of a book (not shown) to be scanned can rest against the obtuse angle. A book or a document is scanned by a light source 20. The sample light ray R is reflected by reflecting mirrors 211, 212, 213 and 214 and then passes througha lens 22 before reaching the sensing device 23. The mirrors 211, 212, 213 and 214 are so placed that the light ray bounces between the first two mirrors 211 and 212 twice in essentially a vertical direction. The vertical light ray reaching the third mirror 213 is defined to the fourth mirror 214 which reflects a horizontal light ray. The reflected light ray from the mirror 214 passes through a lens 22 before impinging on a sensing device 23. By directing vertically the light reflections between the first two mirrors 211, 212, the required dimension in the horizontal direciton is shrunk to save space. Due to reduced space in the horizontal direction, the optical unit can scan closer to the edge of any book folded against the obtuse angle 26A between the window 25 and the side wall 26. The mirror 214 is placed to the left of the light beam R.

Figure 3:
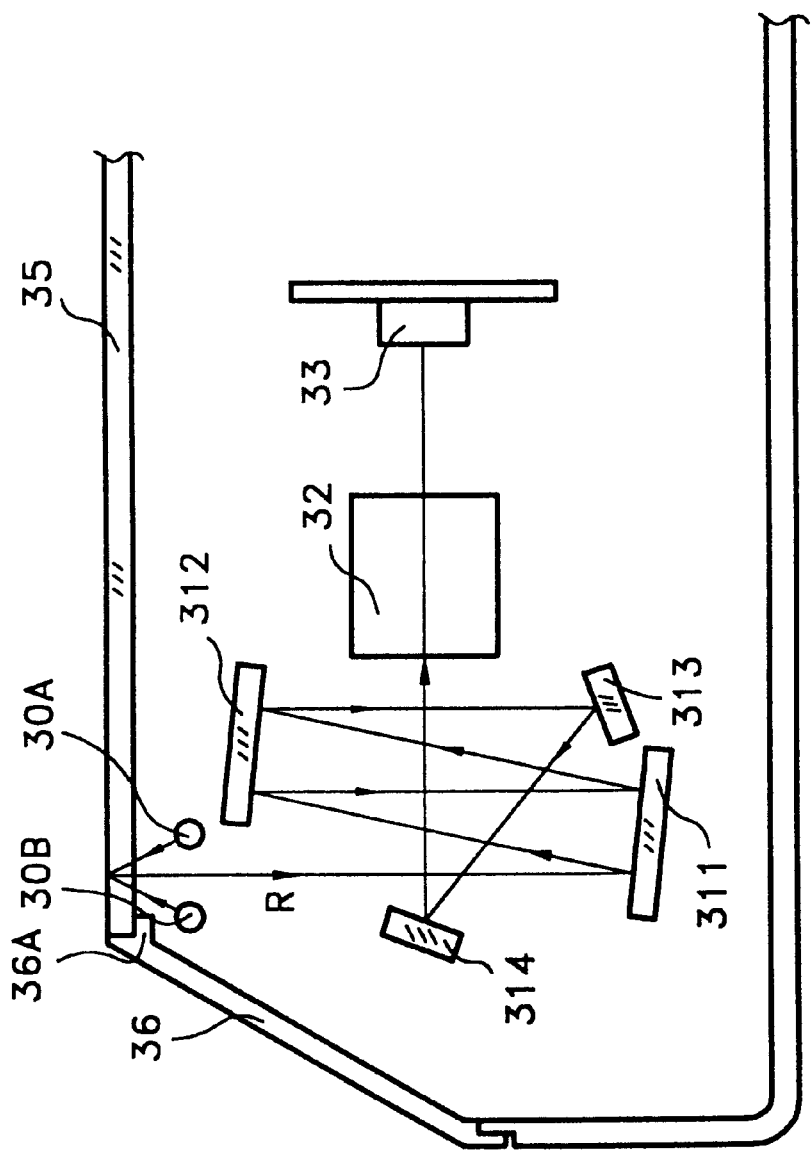
FIG. 3 shows a second embodiment of the optical system with two light sources.

FIG. 3 shows a second embodiment of an optical system of the present invention. There are two lights sources 30A and 330B. The rest of the system is similar to that in FIG. 2. When the dual light source 30A, 30B scans the document (not shown) placed over the scan window 35. The sampled information produces a light ray R., which is reflected twice vertically between mirrors 311 and 312. The vertical light ray is then deflected by a mirror 313 to a mirror 314 which reflects a horizontal light ray or a light ray in a designated direction. The horizontal light then passes through a lens 32 and impinges on a sensor 33. The side wall 36 of the scanner forms an obtuse angle with the scan window 35. The vertical reflections between mirrors 311, 312 allow the optical unit to have a reduced horizontal dimension. The effective scan area can now be extended to the very edge of the scan window 35 at the corner 36A where the scan window 35 forms an obtuse angle with the side wall 36. The obtuse angle allows a book to hug its fold against the scanning window. The reflecting mirror is placed at the left side of the ray R to utilize the space below the slanted side wall 36.

Figure 4:
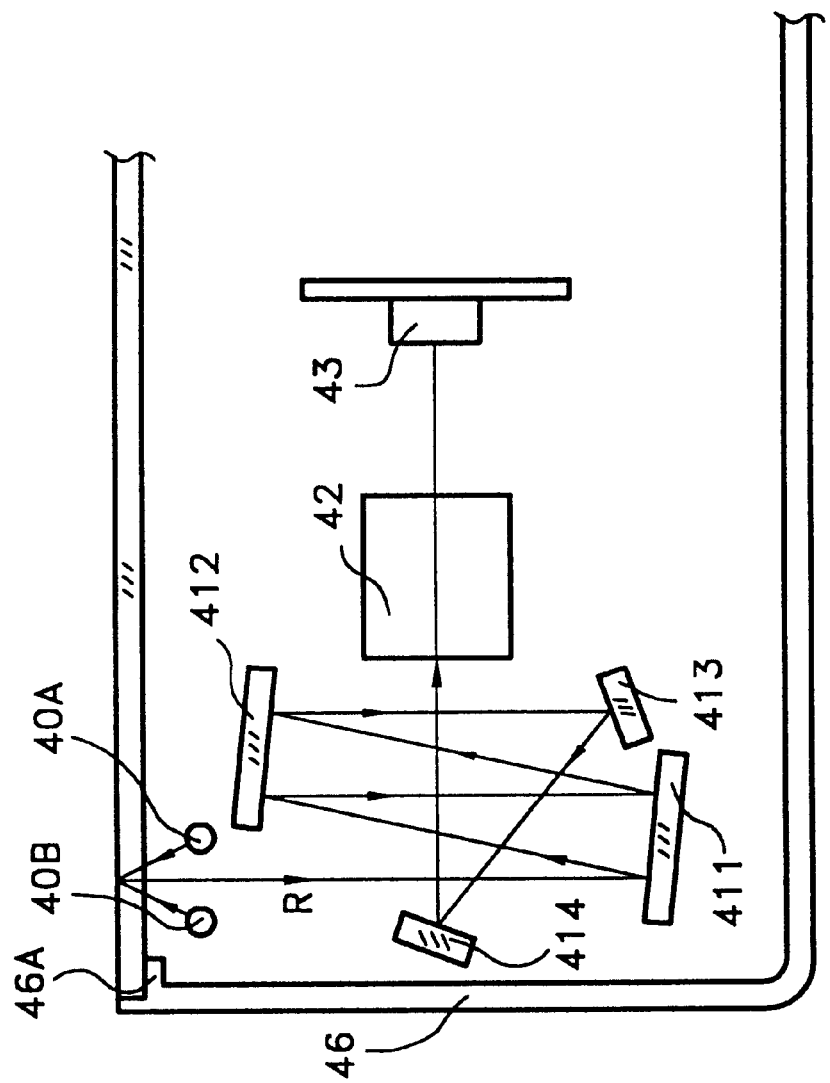
FIG. 4 shows a third embodiment of the optical system with a side wall at right angle with the scanning window.

FIG. 4 shows a third embodiment of the present invention. The feature of this embodiment is that the side walls 46 of the chassis makes a right angle with the scanning window 45 at the corner 46A. The right angle serves to fit a folded book (not shown) ever the edge. The other parts of the optical system is similar to FIG. 3. Two lights sources 40A and 40B scan a document on the scanning window 45 and produce a light ray R. The light ray R is reflected in a vertical direction twice by mirrors 411, 412 before being deflected by mirror 413 toward mirror 414. The last reflected ray from mirror 414 produces a light beam horizontally or in a designated direction through a lens 42 and is then incident on the sensor 43. The placement of the mirror 414 is to the left of the light ray R. As in FIG. 4, the optical system allows the light source to scan to the edge of the window 45.

Figure 5:
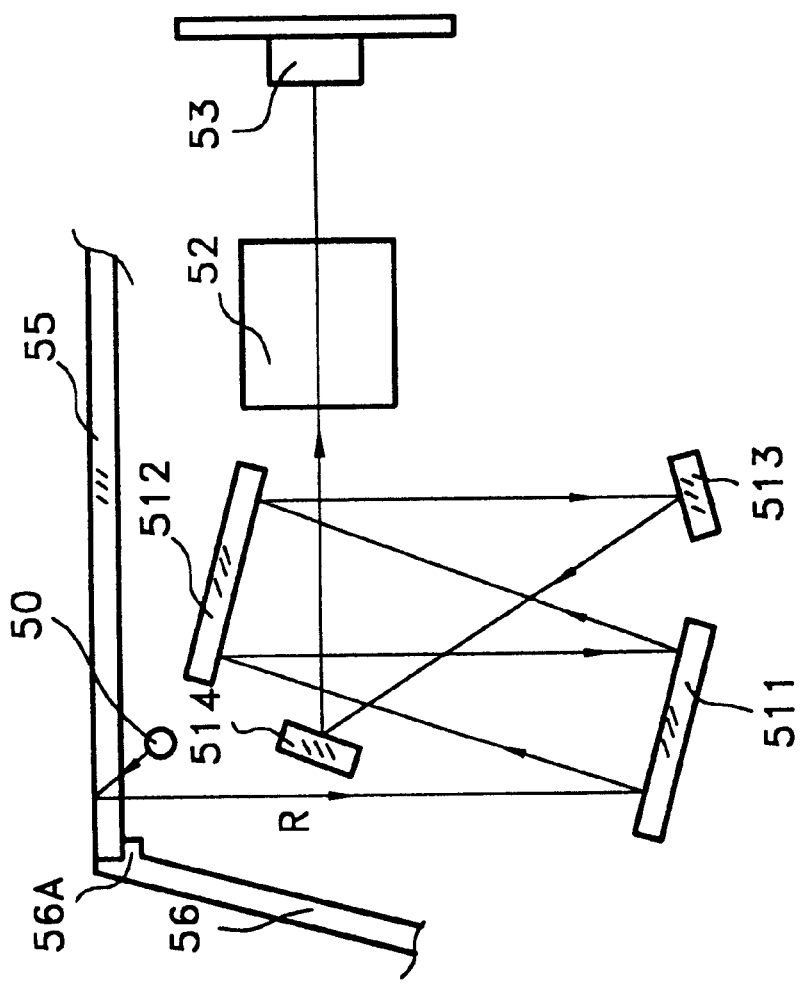
FIG. 5 shows a fourth embodiment of a present invention.

FIG. 5 shows a fourth embodiment of the present invention. This embodiment is similar to FIG. 2 except that the mirror 514 for producing a light beam in a horizontal direction or a designated direction is placed at the right side of the vertical reflected light ray R which has been sampled from the document on the window 55. The side wall 56 forms an obtuse angle with the scanning window 55 at the corner 56A. The single light source scans the document (not shown) placed over the window 55 to produce the light ray R, which is reflected vertically by mirrors 511, 512 twice, before being deflected by mirror 515 toward mirror 514. The mirror 514 reflects a light ray in the horizontal direction or any designated direction through a lens 52 before impinging on the sensor 53.

Figure 6:
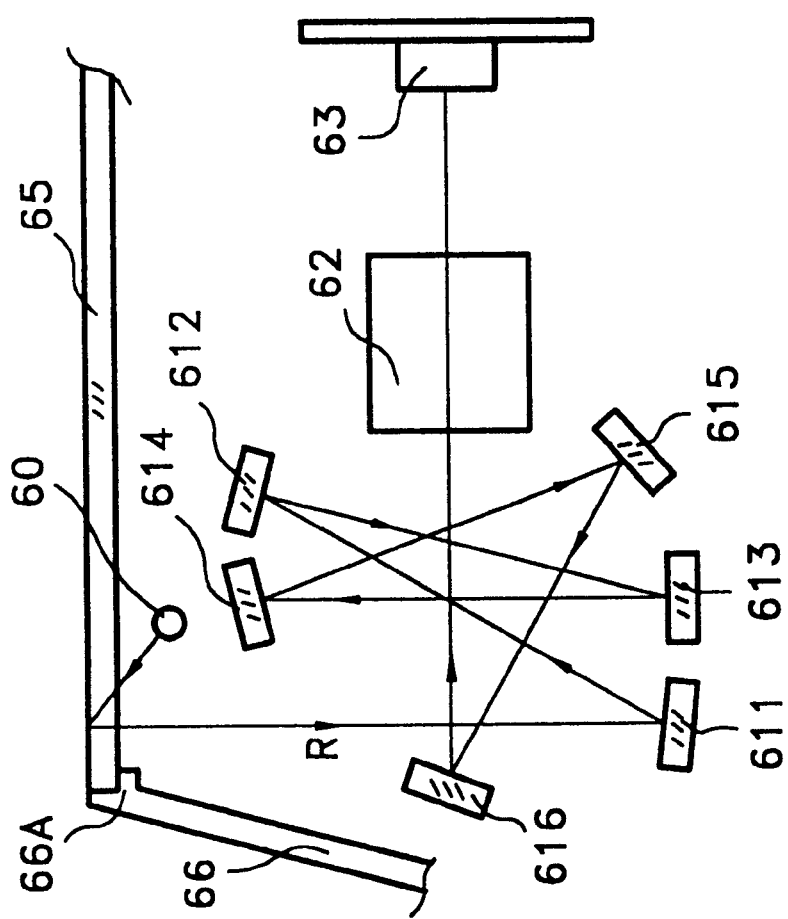
FIG. 6 shows a fifth embodiment of the present invention.

FIG. 6 shows a fifth embodiment of the present invention. Here six reflecting mirrors 611, 612, 613, 614, 615, 616 are used instead of the four mirrors used in FIG. 3. Each mirror reflects the light only once instead of two times by mirrors 211 and 212 in FIG. 2. The light ray R sampled from the scanning light source 60 is reflected in essentially the vertical direction by mirrors 611, 612, 613, 614, in sequence before being deflected by mirror 615 toward mirror 616. The light ray reflected by mirror 616 is in a horizontal direction or a designated direction passes through lens 62 before being incident on an image sensor 63. The last mirror 616 is placed to the left of the light ray R.

Figure 7:
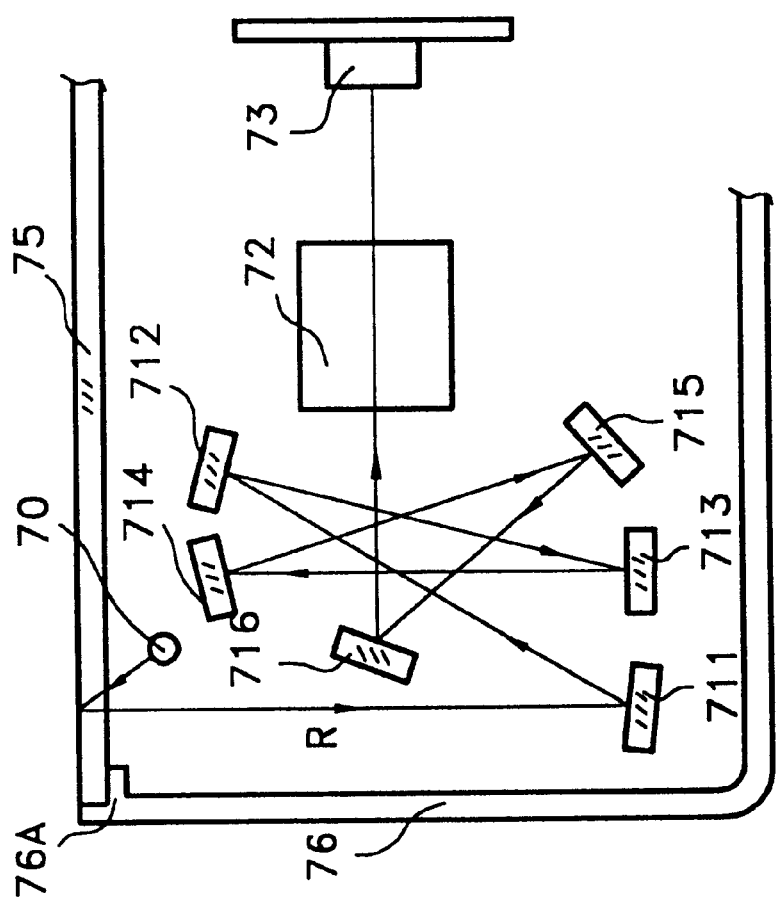
FIG. 7 shows a sixth embodiment of the present invention.

FIG. 7 shows a sixth embodiment of the present invention. The structure is similar to that in FIG. 6 except that the last reflecting mirror 716 is placed at the right side of the sampled light ray R and that the side wall 76 forms a right angle with the scanning window 75 at the corner 76A. When the corner 76A is a right angle, the space between the ray R and the side wall 76 is lass than that in FIG. 6, and therefore the last reflecting mirror 716 is placed to the right the ray R. The light ray R is reflected by mirrors 711, 712, 713, 714 before deflected by mirror 715 toward mirror 716. The reflected light from mirror 716 passes through the lens 72 before impinging on the image sensor 73.

Figure 8:
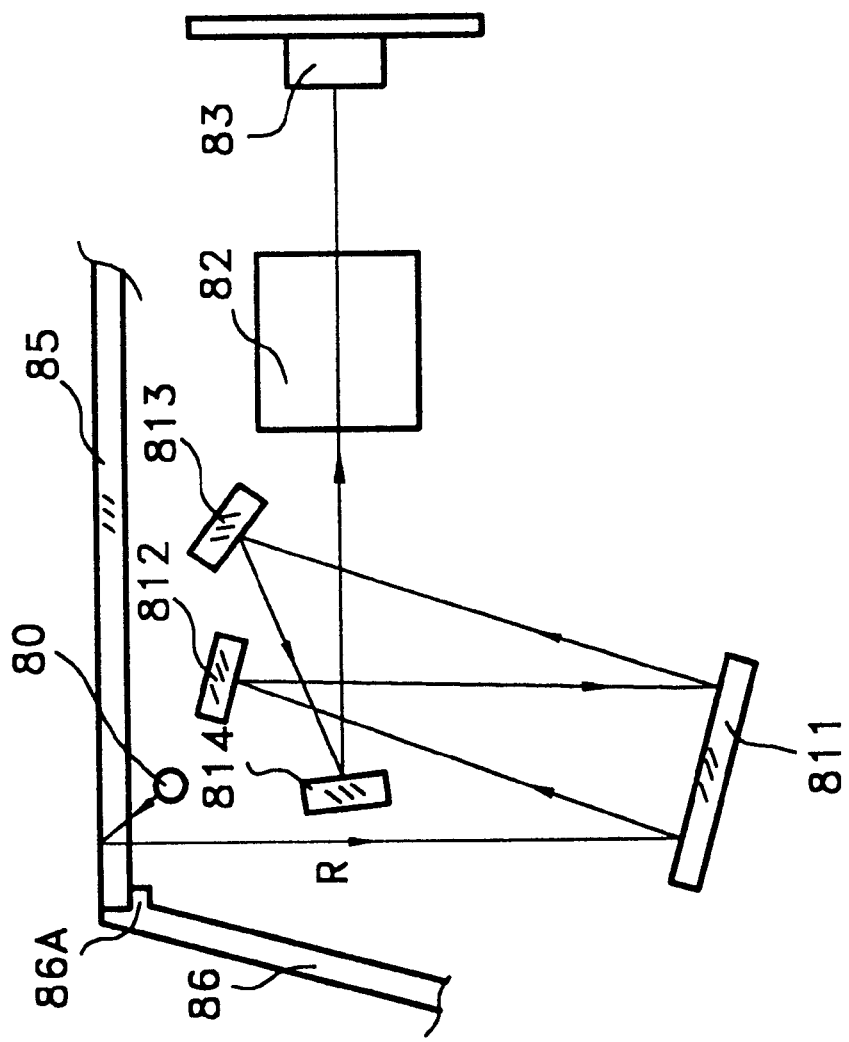
FIG. 8 shows a seventh embodiment of the present invention.

FIG. 8 shows a seventh embodiment of the present invention. In this embodiment, the first reflecting mirror 811 reflects the light ray twice and all the other mirror reflects the light ray only once. Otherwise, the structure is similar to that in FIG. 6. The scanning window 85 forms an obtuse angle with the side wall 86 at a corner 86A. The light source 80 samples a document (not shown) placed on the window 85 to produce a light ray R. The light Ray R is reflected vertically by mirror 811, 812, 811 again before being deflected by mirror 813 toward mirror 814. There is one less reflection than the optical system of FIG. 5. The light reflected by mirror 814 in a horizontal direction passes through a lens 82 and impinges on the image sensor 83. The last reflecting mirror is placed to the right of the light ray R.

Figure 9:
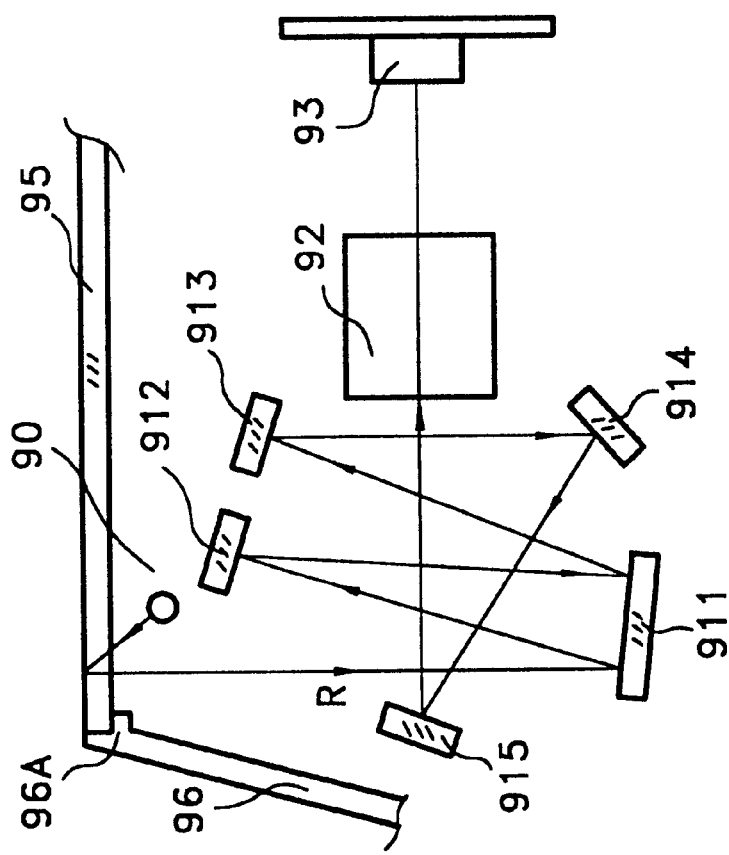
FIG. 9 shows a eighth embodiment of the present invention.

FIG. 9 shows an eighth embodiment of the present invention. The optical system is similar to that shown in FIG. 6 except that two of the mirrors in FIG. 6, 611 and 613 are combined as one single mirror 911. The scanning window 95 forms an obtuse angle with the side wall 96 at a corner 96A. The light source 90 samples a scanned document (not shown) placed over the window 95 to form a light ray R. The is reflected in a vertical direction sequentially by mirrors 911, 912, 911 again, 913 and then deflected by mirror 914 toward mirror 915. The reflected horizontal light ray from mirror 915 passes through a lens 92 to impinge on the image sensor 93. The last reflecting mirror 915 is placed to the left of the light ray R.

Figure 10:
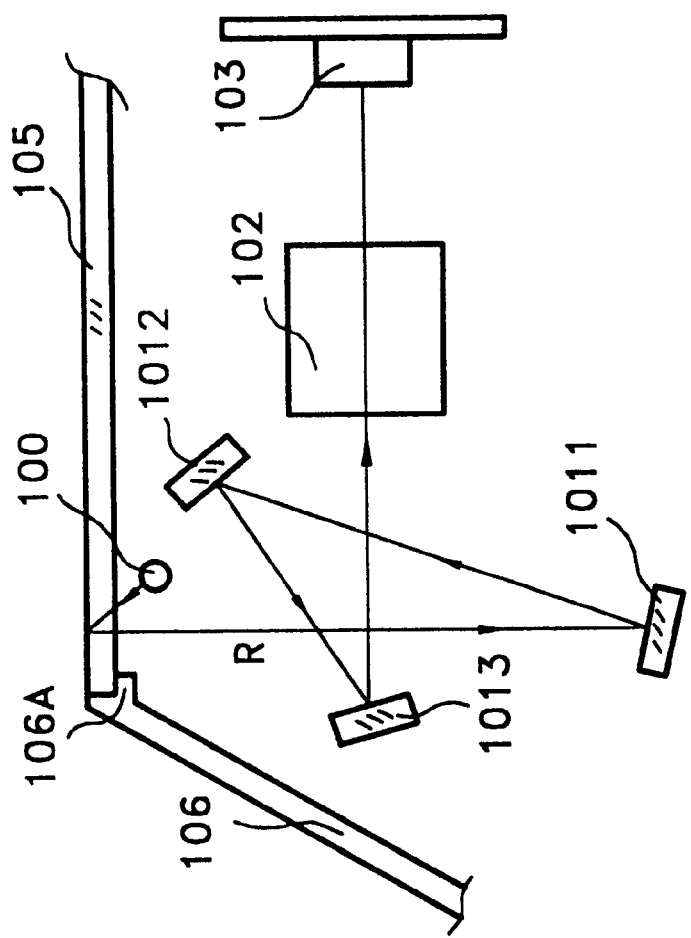
FIG. 10 shows a nineth embodiment of the present invention.

FIG. 10 shows a ninth embodiment of the present invention. The optical system is similar to that in FIG. 2 except one less mirror is used, and hence fewer reflections. The scanning window 105 forms an obtuse angle with the side wall 106 at a corner 106A. A light source 100 scan a document (not shown) placed over the window to produce a light ray R in a vertical direction. The ray R is reflected e nearly vertically by mirror 1011 and deflected by mirror 1012 toward mirror 1013. The reflected light from mirror 1013 is in a horizontal direction or a designated direction passes through a lens 102 and reaches a sensor 103. The last reflecting mirror is placed to the left of the ray R.

While the preferred embodiments of the invention have been described, it will be apparent to those skilled in the art that various modifications may be made in a the embodiment without departing from the spirit of the present. Such modifications are all within the scope of this invention.

What is claimed is:

1. An optical system for a scanner having a document placed over a scanning window supported by side walls of a frame, comprising:
   at least one light source for scanning said document and reflecting a first light ray in a nearly vertical direction;
   at least one mirror for reflecting said first light ray;
   a deflecting mirror for deflecting said first ray toward a last mirror to produce a second light ray in a designated direction;
   a lens for focusing the light emitted from said last mirror, placed opposite to the normally folding edge of said document with respect to said first light ray, when the document is a book to provide a space-saving optical system by allowing the scanner to scan close to the folding edge of the book, which is positioned at an obtuse angle between said window and one of said walls.

2. An optical system as described in claim 1, wherein said scanning window forms with one of side walls at an angle no less than 90 degrees.

3. An optical system as described in claim 1, wherein said last mirror is placed away from said lens with reference to said ray.

4. An optical system as described in claim 1, wherein said last mirror is placed toward said lens with reference to said ray.

5. An optical system as described in claim 1, wherein said designated direction is a horizontal direction.

6. An optical system as described in claim 1, wherein said ray is reflected by two mirrors before reaching said deflecting mirror.

7. An optical system as described in claim 6, wherein two mirrors are used to reflect said ray four times, each one of said two mirrors reflecting twice.

8. An optical system as described in claim 6, wherein four mirrors are used to reflect said ray four times, each one said four mirror reflecting once.

9. An optical system as described in claim 6, wherein three mirrors are used to reflect said ray four times, one of said mirrors reflecting twice and two of said mirrors reflecting once.

10. An optical system as described in claim 1, wherein said ray is reflected with three mirrors before reaching said deflecting mirror.

11. An optical system as described in claim 10, wherein two mirrors are used to reflect said ray three times, one of said mirrors reflecting once, and another one of said mirrors reflecting twice.

12. An optical system as described in claim 1, wherein said ray is reflected once before reaching said deflecting mirror.

13. An optical system as described in claim 12, wherein one single mirror is used to reflect said ray.

14. An optical system as described in claim 1, wherein said light source is a dual light source.

15. An optical system as described in claim 1, wherein said angle is an obtuse angle.

16. An optical system as described in the claim 1, wherein said angle is a right angle.

* * * * *